Jan. 2, 1951 L. J. PARKER 2,536,854
COMBINATION BRAKE AND GAS PEDAL FOR AUTOMOBILES
Filed May 31, 1949 2 Sheets-Sheet 1
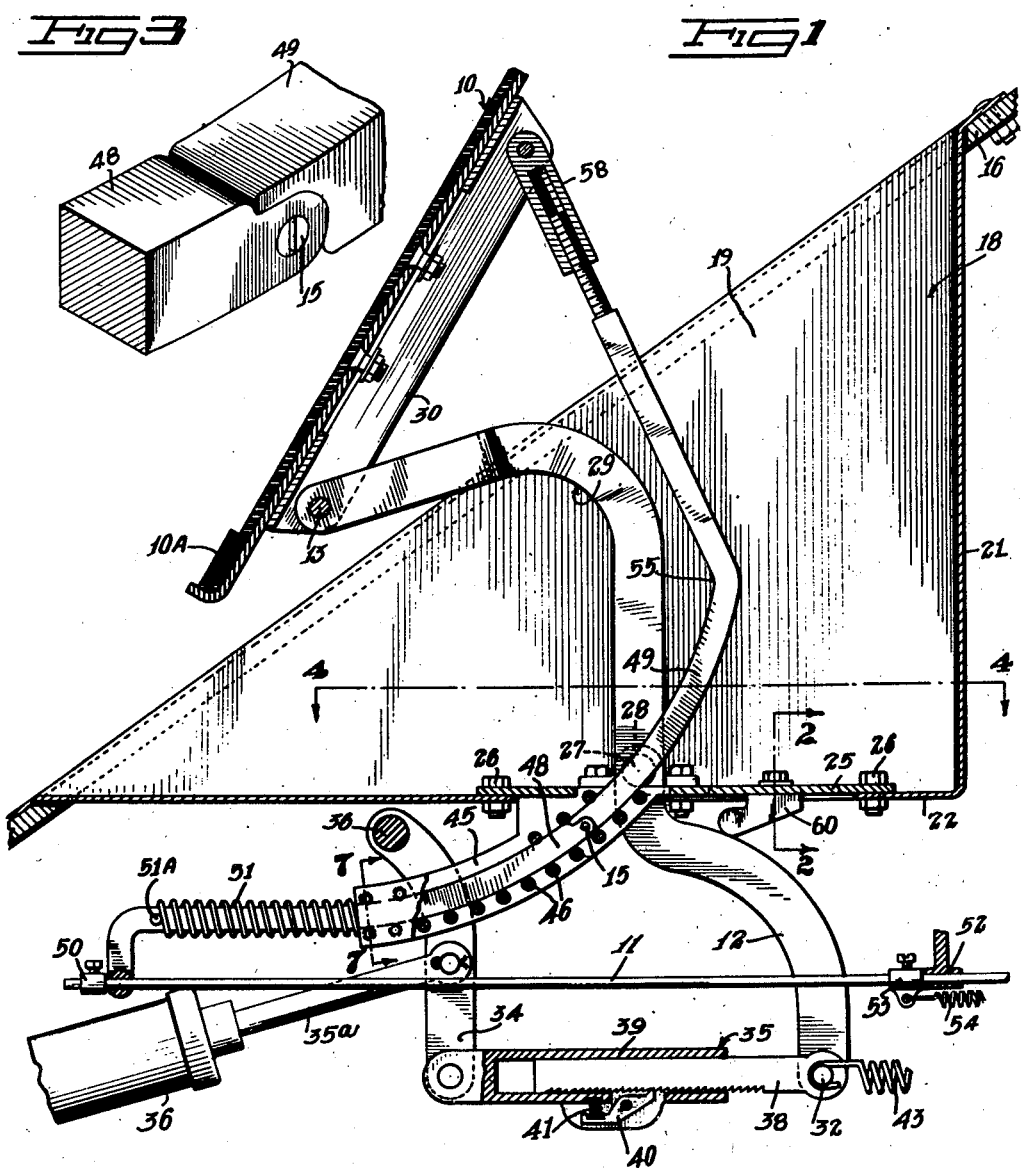
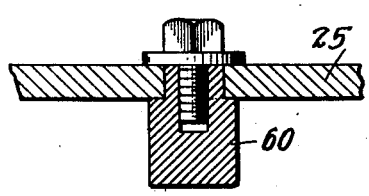
INVENTOR.
Lester J. Parker
BY
Lyon & Lyon ATTORNEYS.

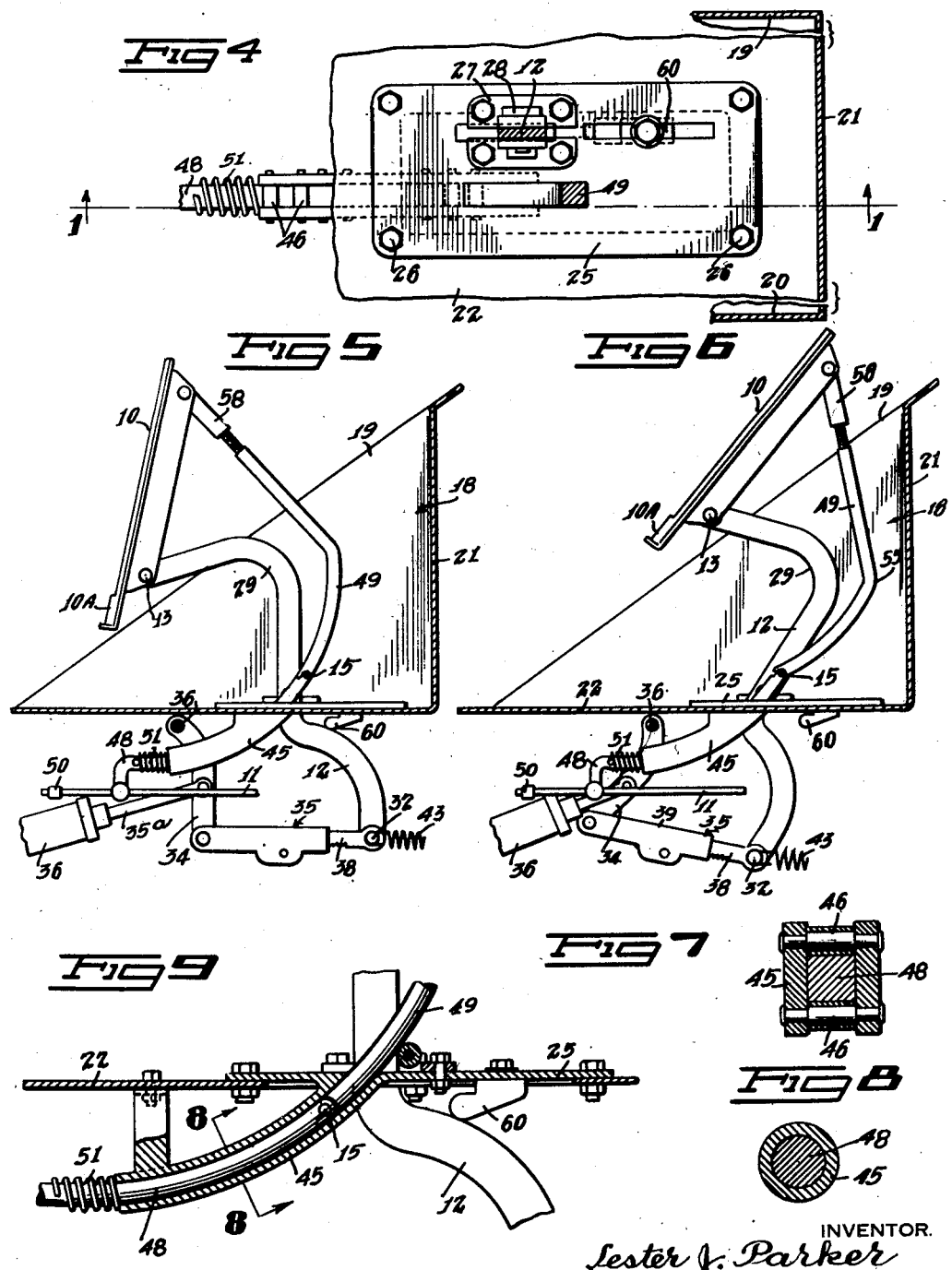

Patented Jan. 2, 1951

2,536,854

UNITED STATES PATENT OFFICE 2,536,854

COMBINATION BRAKE AND GAS PEDAL FOR AUTOMOBILES

Lester J. Parker, Los Angeles, Calif.

Application May 31, 1949, Serial No. 96,193

3 Claims. (Cl. 192—3)

1

The present invention relates to a combination brake and accelerator control for use in present day automobiles.

It is desirable, in the interest of safety and convenience, to have as few foot controlled pedals as possible in the operation of an automobile. This is particularly true, considering the time required for a normal person to move his foot from the conventional accelerator to the conventional brake pedal in a brake application following a period of acceleration or a period of driving at a substantially constant speed. Such time interval, even though it may be considered to be small, is relatively long with further consideration given to the fact that serious accidents on the highways occur within differences of time amounting to fractions of a second.

It is therefore an object of the present invention to achieve the above mentioned desideratum, and particularly to provide an improved arrangement which necessitates only one foot pedal for brake application and for gas control.

Another object of the present invention is to provide an improved combination brake and accelerator pedal characterized by the fact that the pedal is operated for brake application in the same manner, namely by a generally leg pushing operation as is conventional in present day automobiles, and the pedal is operated in the same manner as a conventional accelerator pedal, namely by pivoting the foot about the ankle to increase the gas flow to the engine of the automobile.

A subsidiary object of the present invention is to provide an improved pedal control having the features mentioned in the preceding object, so that a person may readily learn and practice the operation of such combination foot control.

Another object of the present invention is to provide an improved combination brake and accelerator control characterized by its simplicity and ease of installation both in existing automobiles and in the manufacture of new automobiles.

Yet another object of the present invention is to provide an improved control of the character described, characterized by the fact that adjustments may be made in the brake control, as the brakes become worn or changes occur in the hydraulic brake system, without effecting the operation of the accelerator control.

Yet another object of the present invention is to provide an improved combination brake and accelerator foot operated control characterized by constructional features thereof allowing the foot operated pedal to be placed in an inconspicuous place and yet allowing application of brakes with a relatively small foot pressure.

A further object of the present invention is to provide a foolproof combination brake and accelerator foot operated pedal mechanism which incorporates improved means preventing operation of the accelerator control when the brakes are being applied, and vice versa.

The features of the present invention which are believed to be novel are set forth with particularity in the appended claims. The invention itself, both as to its organization and manner of operation, together with further objects and advantages thereof, may be best understood by reference to the following description taken in connection with the accompanying drawings in which:

Figure 1 is a view taken substantially on the line 1—1 of Figure 4 through a combination brake and accelerator control embodying features of the present invention, Figure 2 is a sectional view taken substantially on the line 2—2 of Figure 1, Figure 3 is a perspective view of a portion of the accelerator rod, showing the hinge connection between elements thereof for purposes of achieving important results, Figure 4 is a view taken substantially on the line 4—4 of Figure 1, Figures 5 and 6 are views of the apparatus similar to the views shown in Figure 1 but show the progressive relationship the parts assume, in that order, when and as the pedal 10 is actuated in a braking application. In other words, in a brake application the pedal 10 is moved first from the position shown in Figure 1 to the position shown in Figure 5 and then to the position shown in Figure 6, Figure 7 is a sectional view taken substantially on the line 7—7 of Figure 1, Figure 8 is a sectional view taken on the line 8—8 of the modification shown in Figure 9, and Figure 9 is a sectional view corresponding to the sectional view shown in Figure 1 of a modified construction for also achieving the purposes of the present invention.

In accordance with the present invention the foot operated pedal 10 may be used to either control the flow of gas to the associated automobile by moving the "gas" rod 11 (Figure 1) in its longitudinal direction, or, in the alternative, to apply the brakes to the associated automobile by movement of the brake lever 12 (Figure 1), a feature of the present invention being that only the rod 11 or lever 12, as the case may be, may be moved at one time, the other member 11, 12, as the case may be, being prevented from movement.

Preferably, when it is desired to actuate the accelerator control rod 11, the pedal 10 is simply pivoted about the relatively fixed pivot pin 13, accomplished by pressing the ball of the foot against the upper portion of the pedal 10, using an ankle movement of the foot. When it is desired to apply the brakes, the lower portion 10A of the pedal 10 is first pivoted counterclockwise in Figure 1 about the fixed pivot pin 13, and the foot pedal 10 is shoved generally downwardly by moving the foot downwardly without pivoting it about the ankle; in other words, by simply shoving the pedal 10 downwardly as is normally conventional in the application of the brake pedal in conventional present day automobiles.

Normally, the pedal 10, without foot pressure being applied thereto, is in condition for immediate actuation of the gas control rod 11, since a rigid connection at this time exists between the pedal 10 and the gas control rod 11. This rigid connection between the pedal 10 and control rod 11 may be "broken" to prevent operation of the control 11 by first pivoting the lower end 10A of the pedal 10 about the relatively fixed axis 13, whereupon such rigid connection is "broken" at 15 (Figures 1 and 3) to allow subsequent downward movement of the pedal 10. Details of this construction appear hereinafter.

The combination brake and gas control is mounted generally on an automobile in substantially the same position occupied by the conventional brake pedal with the pedal 10 above the sloping floor board 16 of the automobile, and with the mechanism mounted in a well 18 below such sloping portion of the floor board. This well 18 is defined by spaced parallel walls 19, 20 and the forward wall 21 and the bottom wall or floor 22, all of which may be of sheet metal construction and fastened by suitable bolts to the floor board 16.

This floor member 22 has, in turn, releasably mounted thereon a stationary plate 25 by means of bolts 26. This plate 25 has mounted thereon a bearing 27 for pivotally supporting the lever arm 12, there being provided for that purpose a shaft 28 on the arm 12 for cooperation with the bearing 27.

The upper end of the arm 12 is bent at an angle somewhat greater than ninety degrees at 29, and is pin-connected at 13 to the pedal backing plate 30 which may be of angle iron construction, it being noted that the bend 29 is in a more elevated position than the pivot 13. The lower end of the arm 12 is pin-connected at 32 to the lever 34 through the adjustable length arm 35, which is pin-connected to both levers 12 and 34. The lever 34 is pivoted at its upper end on the relatively stationary pivot pin 36, and an intermediate portion of such lever 34 is pin-connected to the reciprocable rod 35a normally associated with the hydraulic piston and cylinder assembly 36 for controlling the flow of hydraulic braking fluid to the wheels of the associated automobile for effecting braking thereof.

The arm 35 may be adjusted in length to compensate for wear of the brakes or changes in the condition in the associated hydraulic braking system. This arm 35 may take different forms and shapes, and may comprise simply, as shown herein, a rectangular shaped rigid bar 38 slidably mounted in the cooperating housing 39, upon which is pivotally mounted the pawl member 40 for engagement with the teeth on the rigid member 38, such pawl 40 being normally biased in engagement with such teeth by the coil compression spring 41. Also, such extensible arm 38 is normally biased to the right in Figure 1 by the coil tension spring 43 having one of its ends mounted on the pivot pin 32 and the other one of its ends attached to the chassis (not shown) of the automobile. Thus, with the mechanism thus far described, assuming that the arm 12 pivots clockwise about the axis of the shaft 28, the control rod 35a is moved to the left to cause application of the brakes of the associated automobile.

Also, mounted on the plate 25 is the arcuate shaped guide 45 with anti-friction rollers 46 thereon, as indicated in Figures 1 and 7, for providing guided anti-friction movement of the arcuate shaped arms 48, 49 which are pin-connected for hinged movement at 15. In the normal position of the foot pedal 10 (in the position of the foot pedal 10 without the operator's foot being applied thereto) the adjacent ends of the arcuate shaped arms 48, 49 are disposed within the arcuate guide 45 so as to prevent pivotal movement of the arms 48, 49 with respect to one another. In other words, in such normal position the arcuate shaped arms 48, 49 are, for all intents and purposes, a rigid link. The arm 48 at its lower end is bent and apertured to allow passage therethrough of the control rod 11. The adjustable releasable stop member 50 on the rod 11 prevents withdrawal of such rod 11 through the apertured portion of the lower end of lever 48. The other, or right hand end of rod 11 in Figure 1 passes through a relatively stationary guide member 52, and has mounted thereon an adjustable releasable stop member 53 to which is attached a coil tension spring 54 for normally biasing the rod 11 to the right with the stop 53 engaging the relatively stationary guide 52, it being noted that the other end, or right hand end of coil tension spring 54 is attached to a relatively stationary portion of the automobile such as the chassis (not shown).

The coil compression spring 51, concentrically mounted around the arm 48, has one of its ends abutting against the pin 51A affixed to the arm 48, and the other one of its ends abutting the guide 45 to thereby bias the arms 48, 49 downwardly within the guide member 45 in the position shown in Figure 1 to form, for all intents and purposes, a rigid connection between the arms 48, 49.

The arcuate shaped arm 49 is bent at 55 with the upper end thereof externally threaded in the internally threaded sleeve member 58, which is pin-connected to the pedal member 30 so that the effective length of the arm 49 may be adjusted.

Also mounted on the removable bottom plate 25 is the stop member 60 adapted to engage the brake arm 12 to limit its movement when it is free to move under the influence of coil tension spring 43.

It is now clear, from the apparatus described hereinabove, and with respect to Figures 5 and 6, that when the upper portion of the pedal 10 is pivoted about the pin 13 by, for example, the operator applying his foot to the pedal 10 and pivoting his foot about his ankle, the gas control rod 11, attached to a suitable carburetor control of the associated automobile, is moved to effect acceleration of the automobile; this is true since under these circumstances the arcuate arms 48, 49 are prevented from pivoting one with respect to the other, and a rigid connection thus exists between the pedal 10 and the gas control rod 11. However, if it is desired to apply the brakes here, pressure is applied to the lower end 10A of the pedal 10 to cause the pedal 10 to rotate counter-clockwise about the pivot 13, to thereby draw the arcuate shaped arm 49 out of its guide 45 to a position corresponding to Figure 5. When the arm 49 assumes this position, the heretofore "rigid" connection between arms 48 and 49 is "broken" and the arm 49 is allowed to pivot with respect to the arm 48. Thus, when the arm 49 is moved to its upward position shown in Figure 5, the pedal 10 is pushed downwardly in a direction perpendicular to the plane of the pedal, as in a conventional braking operation in present day automobiles, in which case now, since the connection between arms 48 and 49 is broken, the arm 12 is allowed to pivot about the axis of the shaft 28 to pivot the control arm 34 to move the pin-connected control shaft 35.

Thereafter, when it is desired to discontinue the braking operation, the operator lifts his foot from the pedal 10 and the parts of the device assume the relative positions shown in Figure 1, wherein they are in a position to control the flow of gasoline to the associated automobile.

As a practical matter, while the operation of the individual parts may appear to be involved, this system may be operated very simply and quickly in practice.

In the modification shown in Figures 8 and 9, the guide 45 instead of being rectangular as shown in Figure 7 may be made circular in cross-section to guidingly receive the circularly cross-sectioned pivotally connected arms 48, 49, which are hinged together by the pivot pin 15, but which again are prevented from pivoting one with respect to the other in their normal positions, since adjacent ends thereof are both within the guide structure 45.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a combination gas and brake arrangement of the type described, a single foot operated pedal pivoted at a point intermediate its ends to one end of a lever, said lever being pivotally mounted on the chassis of an associated automobile at a point intermediate its ends with the other end of said lever attached to a control element of a brake piston and cylinder assembly, said brake pedal being pivotally attached in proximity to one of its ends to an arcuate shaped arm, said arcuate shaped arm being hingedly connected to a second arcuate shaped arm, and the other end of said second arcuate shaped arm being connected to the gas control of the associated automobile, the adjacent ends of said arcuate shaped arms being normally confined in an arcuate shaped guide member preventing hinged movement between said arcuate shaped arms, said foot operated pedal being pivotally mounted on said lever to effect withdrawal of the adjacent ends of said arms out of said arcuate shaped guide to allow hinged movement between said arms and to allow said lever to rotate to allow actuation of the brake control.

2. In a combination brake and gas control of the character described, a single foot operated pedal arranged for rocking pivoted movement on a brake control lever, a connection between said pedal and a gas control element of an associated automobile, said connection comprising a pair of hinged elements movable in a guide member which serves to prevent hinged movement of said elements and establishes a rigid connection between said pedal and said gas control element, and said elements comprising said connection being withdrawable from said guide upon rocking movement of said pedal to allow hinged movement of said elements.

3. The invention defined in claim 2 with a well mounted on the floorboard of said associated automobile, and means pivotally mounting said brake control lever within said well.

LESTER J. PARKER.

REFERENCES CITED

The following references are of record in the file of this patent:

UNITED STATES PATENTS

| Number | Name | Date |
| --- | --- | --- |
| 1,230,426 | Murray | June 19, 1917 |
| 1,535,867 | Sears | Apr. 28, 1925 |
| 1,815,270 | Rector | July 21, 1931 |
| 2,113,974 | Arkley | Apr. 12, 1938 |
| 2,258,627 | Siesennop | Oct. 14, 1941 |